Figures 1, 8, 9:
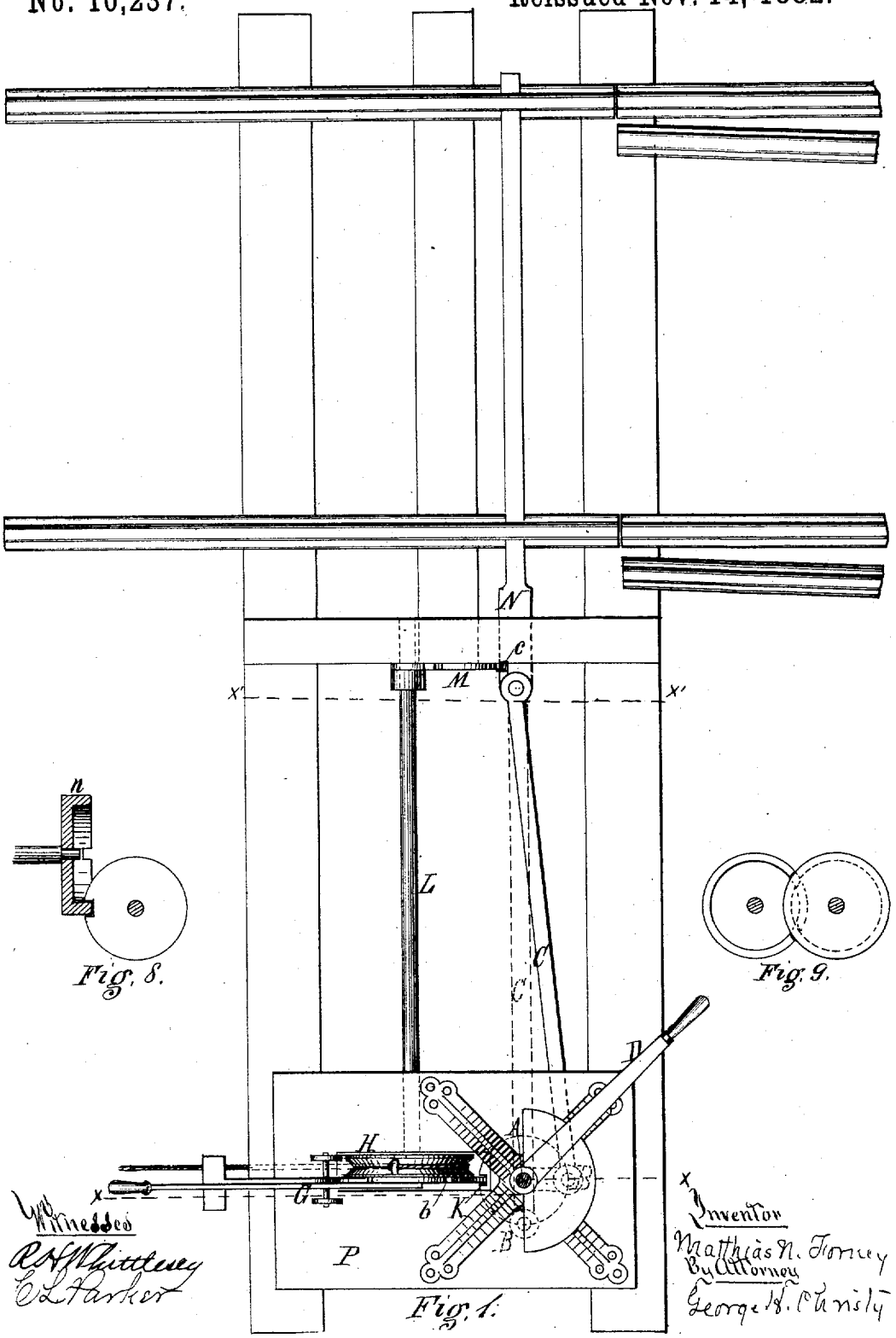

2 Sheets—Sheet 1.

M. N. FORNEY.

INTERLOCKING SWITCH AND SIGNAL APPARATUS.

No. 10,237. Reissued Nov. 14, 1882.

Witnesses
R. H. Whittemore
E. L. Parker

Inventor
Matthias N. Forney
By Attorney
George H. Christy

N. PETERS, Photo-Lithographer, Washington, D. C.

M. N. FORNEY.
INTERLOCKING SWITCH AND SIGNAL APPARATUS.
No. 10,237. Reissued Nov. 14, 1882.
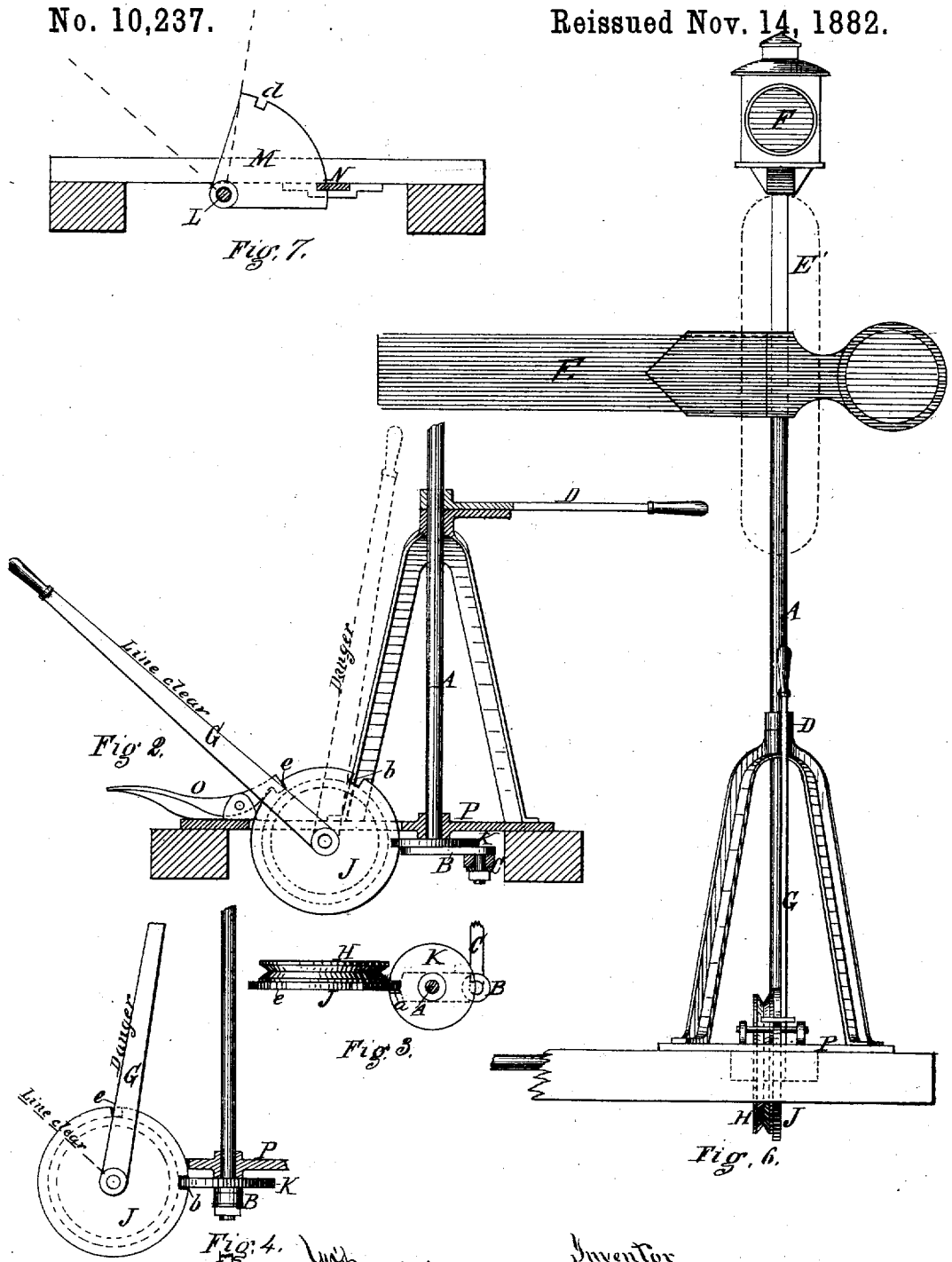
Witnesses.
R. N. Whittemore
E. L. Parker
Inventor
Matthias N. Forney
By Attorney
George H. Christy
N. PETERS, Photo-Lithographer, Washington, D. C.

UNITED STATES PATENT OFFICE.

MATTHIAS N. FORNEY, OF NEW YORK, N. Y.

INTERLOCKING SWITCH AND SIGNAL APPARATUS.

SPECIFICATION forming part of Reissued Letters Patent No. 10,237, dated November 14, 1882.

Original No. 247,034, dated September 13, 1881. Application for reissue filed March 17, 1882.

*To all whom it may concern:*

Be it known that I, MATTHIAS N. FORNEY, of New York, county of New York, State of New York, have invented or discovered a new and useful Improvement in Interlocking Switch and Signal Apparatus; and I do hereby declare the following to be a full, clear, concise, and exact description thereof, reference being had to the accompanying drawings, making a part of this specification, in which—like letters indicating like parts—

Figure 1, Sheet 1, is a plan view of a stub-switch with my improved apparatus applied thereto. Fig. 2, Sheet 2, is a view in elevation of the shifting mechanism in the plane of the line *x x* of Fig. 1. Fig. 3 is a top or plan view of the interlocking disks of Fig. 2. Fig. 4 is a side elevation of the same, but illustrative of a different position from that shown in Fig. 2. Fig. 5 is a view similar to that of Fig. 3, but showing a different position. Fig. 6 is a view in elevation at right angles to that of Fig. 2, and also showing the switch-targets; and Fig. 7 is a sectional view in the plane of the line *x′ x′*, Fig. 1.

My present invention relates to certain improvements in interlocking switch and signal apparatus, wherein by the use of notched disks or sectors of disks the peripheries of which or the curved portions of which intersect or cross each other I provide for the locking of one movable appliance by the setting of another, and also wherein by the use of a recessed disk or sector and a notched bar I effect another locking in another possible adjustment of the apparatus; and while my present improvements, or some of them, may have many possible advantageous uses for signaling purposes they are primarily designed for use in connection with a switch and with a signal arranged at a proper distance up or down the track for the protection of the switch, especially when set to the siding.

In the drawings I have shown the simplest form of this system as applied to an ordinary switch-target and distant signal. When the latter is used the danger is that through ignorance, mistake, or carelessness it will not be set to correspond with the position of the switch, so that when the switch is open or set to the siding the distant signal will indicate "line clear." The method here employed is designed to prevent this.

The switch is operated in the usual way—that is, the stand has a vertical shaft, A, with a crank, B, on its lower end, which is connected by a rod, C, with the switch. The vertical shaft is operated by the usual lever, D, and the targets E and E′ and the lamp F are attached to the vertical shaft and turn with it when the switch is moved.

The distant signal is operated by a lever, G, attached to a sheave or pulley, H, on which a wire rope is wound.

It is of course important that when the switch is set for the side track the distant signal should be set to indicate "danger," and that it should never be set to indicate "line clear" until the switch is moved to the main line. More than this, when the two are in the latter positions it should be impossible to move the switch without first setting the distant signal to indicate "danger," and when the switch is moved from the main line it should be impossible to move the distant signal. In other words, when the signal indicates "line clear" it should lock the switch to the main line, and when the switch is moved from the main line it should lock the signal at "danger." This is done in the apparatus illustrated by two disks, J and K, the one, J, attached to the pulley or sheave H and the other, K, to the shaft A. These disks are so placed in relation to each other that their edges intersect, and notches or slots are cut in each, so that only one of them at a time can turn. Figs. 2 and 3 represent a side view and plan of these disks in the position they occupy when the switch is set to the main line and the distant signal to indicate "line clear." It will be seen that the notch *a*, Fig. 3, of the disk K is then opposite to the disk J, and the latter can turn freely. It will be seen, however, from Fig. 2 that when the lever G is thrown into the position shown, which moves the distant signal so as to indicate "line clear," the notch *b* of the disk J occupies the position indicated. The edge of the disk J therefore fills the notch *a* in the disk K, and locks it or prevents the latter from being turned. In other words, the signal at "line clear" has locked the switch to the main line. Figs. 4 and 5 represent the position of the disks when the switch is set to the side track and the signal indicates "danger." It will be seen that then the slot *b* of the disk J comes opposite to K, and therefore the latter can be turned freely; but it will also be seen that the slot *a* of the disk K has been moved away from J a quarter-turn, and that the edge of K engages in the slot *b*, and thus locks J, or the signal is locked at "danger" when the switch is set to the side track.

The pulley and sheave H and the disk J are attached to the end of the shaft L, Fig. 1, the other end of the shaft to another disk or sector, M. (Shown in elevation by Fig. 7.) This sector engages in a notch, *c*, Fig. 1, in the bar N, which connects the two switch-rails together. When the lever G is thrown so as to bring the distant signal to "danger" the notch *d*, Fig. 7, in the sector comes opposite to the bar N, and the latter can then be moved; but if the switch is set to the main line and the distant signal to indicate "line clear" the sector M then engages in the slot *c*, as shown in Fig. 7, and thus effectually locks the switch in its position. Thus, if either of the latter should break while the switch is set to the siding, the shaft A being free to be rotated, the signal might be cleared without restoring the main line; but with the notched sector M and bar N this could not be done. This lock is used as a precaution in case the rod C or crank B should break. When the switch is set for the side track the crank occupies the position B′, Figs. 1 and 5, and the rod C that indicated by the dotted lines in Fig. 1. It will be seen that the crank is then at a dead-point in relation to the rod C, and that any strain in the crank has then no tendency to move it. This arrangement thus secures the switch in its position when set for the side track, while the locking apparatus already described secures it when set for the main track.

The switch-target E, which indicates that the switch is set for the side track, is made in the form of a semaphore, and is painted red. The target E′, to indicate that the switch is set for the main line, is a vertical board or plate, and is painted white.

The switch stand and sheave for working the distant signal are fastened to a cast-iron bed-plate, P P, Figs. 1 and 2.

O, Fig. 2, is a spring-latch, which is operated by the foot and engages in a notch, *e*, in the disk J, and is intended to hold the sheave or pulley J′ in the position it occupies when the distant signal is set to indicate "line clear." The latter, being counterweighted so as to be pulled to the position indicating "danger," would also pull the pulley H to the corresponding position unless it were held in some way.

It will be understood that a sector having an arc of the proper length, and recessed or notched substantially as set forth, may take the place of either of the disks J or K, or such sectors may be substituted for both, and also that a disk may be used in lieu of the sector N, and such, as well as other like mechanical equivalents, as also such modifications as involve no substantial departure from the invention herein described, are included as herein; and it is also true that the interlocking or engaging notched disks or sectors may be usefully employed in other arrangements of signaling apparatus, and all such arrangements as include substantially the operation herein described are hereby included as within the scope of the present invention.

In a separate patent granted to me December 6, 1881, I have included such disks as are herein described in the construction and operation of a system of crossing-signals. Among other possible modifications, I have illustrated in Figs. 8 and 9 the use of flanged disks with the notches cut in the outer edges of the flanges, and I include these devices under the term "disk" or "disks," as herein used, the notched edges then being the peripheries. In Fig. 8 the signal-disk is represented with such a flange, *n*, and a notch in it and one in the switch-shaft disk give the same operation and result as before. In Fig. 9 both disks have the flanged form, and both flanges are so notched that each may lock the other.

It will be observed that in the construction shown and described the peripheries cross each other and effect the locking function by virtue of such crossing, and in this, among other respects, differ from the construction shown and described in English Patent No. 3,427 of 1869, which latter is hereby disclaimed.

I claim herein as my invention—

1. The combination of a notched disk or sector on a rotary switch-shaft and a notched disk or sector on a rotary signal-shaft, such disks being arranged to interlock by the full part in the periphery of one disk engaging in the notch of the periphery of the other disk, substantially as and for the purposes set forth.

2. Two notched disks or sectors the peripheries of which intersect each other, said disks or sectors having notches or recesses arranged substantially as set forth, whereby either disk or sector may be set to lock the other by the full part of the periphery of one disk or sector entering a notch or recess in the other disk or sector.

3. The combination of a notched disk or sector arranged on the rotary switch-shaft, a notched disk or sector on a rotary signal-shaft, a notched sector-plate on the signal-shaft, and a notched switch-bar, substantially as set forth.

In testimony whereof I have hereunto set my hand.

MATTHIAS N. FORNEY.

Witnesses:
GEORGE H. CHRISTY,
WILLIAM H. KENYON.